United States Patent
Udrea et al.

(10) Patent No.: US 10,883,804 B2
(45) Date of Patent: Jan. 5, 2021

(54) INFRA-RED DEVICE

(71) Applicant: AMS Sensors UK Limited, Cambridge (GB)

(72) Inventors: Florin Udrea, Cambridge (GB); Syed Zeeshan Ali, Cambridge (GB); Richard Henry Hopper, Cambridge (GB)

(73) Assignee: AMS SENSORS UK LIMITED, Cambridge (GB)

( * ) Notice: Subject to any disclaimer, the term of this patent is extended or adjusted under 35 U.S.C. 154(b) by 45 days.

(21) Appl. No.: 15/852,225

(22) Filed: Dec. 22, 2017

(65) Prior Publication Data

US 2019/0195602 A1   Jun. 27, 2019

(51) Int. Cl.
| | | |
|---|---|---|
| *F41J 2/02* | (2006.01) | |
| *H01K 1/02* | (2006.01) | |
| *G01J 5/52* | (2006.01) | |
| *G01J 5/02* | (2006.01) | |
| *G01J 3/10* | (2006.01) | |
| *G01J 5/08* | (2006.01) | |

(52) U.S. Cl.
CPC .............. *F41J 2/02* (2013.01); *G01J 3/108* (2013.01); *G01J 5/024* (2013.01); *G01J 5/0225* (2013.01); *G01J 5/0809* (2013.01); *G01J 5/522* (2013.01); *H01K 1/02* (2013.01)

(58) Field of Classification Search
CPC ............... F41J 2/02; G01J 5/522; H01K 1/02
USPC .................... 250/338.4, 338.1, 340
See application file for complete search history.

(56) References Cited

U.S. PATENT DOCUMENTS

| | | | |
|---|---|---|---|
| 5,285,131 A | 2/1994 | Muller et al. | |
| 5,500,569 A | 3/1996 | Blomberg et al. | |
| 5,644,676 A | 7/1997 | Blomberg et al. | |
| 5,827,438 A | 10/1998 | Blomberg et al. | |
| 6,297,511 B1 | 10/2001 | Syllaios et al. | |
| 8,552,380 B1* | 10/2013 | Florin ............ | G01J 5/023 250/338.4 |
| 2005/0178967 A1 | 8/2005 | Nakaki | |
| 2006/0060784 A1* | 3/2006 | Moon ............ | G01J 5/10 250/338.1 |

(Continued)

FOREIGN PATENT DOCUMENTS

| | | |
|---|---|---|
| EP | 2056337 A2 | 5/2009 |
| WO | 02/080620 A1 | 10/2002 |
| WO | 2014037622 A1 | 3/2014 |

OTHER PUBLICATIONS

Parameswaran, M. et al., "Micromachined Thermal Radiation Emitter from a Commercial CMOS Process", IEEE Electron Device Letters, vol. 12, No. 2, Feb. 1991, pp. 57-59.

(Continued)

*Primary Examiner* — Blake C Riddick
(74) *Attorney, Agent, or Firm* — Tucker Ellis LLP

(57) ABSTRACT

We disclose herein an infra-red (IR) device comprising a substrate comprising an etched cavity portion and a substrate portion; a dielectric layer disposed on the substrate. The dielectric layer comprises a dielectric membrane which is adjacent, or directly above, or below the etched cavity portion of the substrate. The device further comprises a reflective layer on or in or above or below the dielectric membrane to enhance emission or absorption of infrared light at one or more wavelengths.

17 Claims, 7 Drawing Sheets

(56) References Cited

U.S. PATENT DOCUMENTS

| | | | |
|---|---|---|---|
| 2006/0118721 A1* | 6/2006 | Antoszewski | G01J 3/02 250/338.4 |
| 2008/0251723 A1* | 10/2008 | Ward | G01J 5/02 250/338.4 |
| 2008/0272389 A1 | 11/2008 | Rogne et al. | |
| 2009/0159123 A1* | 6/2009 | Kothari | H01L 31/02165 136/256 |
| 2010/0133419 A1* | 6/2010 | Suetake | H01L 27/14618 250/208.1 |
| 2011/0057107 A1* | 3/2011 | Agnese | G01J 5/08 250/338.3 |
| 2011/0063717 A1* | 3/2011 | Consonni | G01Q 60/22 359/298 |
| 2012/0126121 A1* | 5/2012 | Graham | G01J 1/46 250/338.4 |
| 2012/0161010 A1* | 6/2012 | Azzazy | H01J 29/89 250/353 |
| 2012/0235038 A1* | 9/2012 | Nishikawa | G01J 5/0014 250/338.3 |
| 2012/0235067 A1* | 9/2012 | Araci | B82Y 20/00 250/504 R |
| 2012/0267532 A1* | 10/2012 | Udrea | H05B 3/267 250/338.5 |
| 2013/0235210 A1* | 9/2013 | Tinkler | G01J 5/20 348/164 |
| 2014/0231635 A1* | 8/2014 | Kerness | G01S 17/026 250/226 |
| 2014/0291704 A1* | 10/2014 | Ali | H01L 33/34 257/88 |
| 2015/0316472 A1* | 11/2015 | Yon | G01J 5/20 356/437 |

OTHER PUBLICATIONS

Bauer, D. et al., "Design and fabrication of a thermal infrared emitter", Institute for Microsensors, actuators and systems (IMSAS), Department of Physics and Electrical Engineering, University of Bremen, 1996, pp. 57-63.

Yuasa H. et al., "Single Crystal Silicon Micromachined Pulsed Infrared Light Source," Transducers '97, International Conference on Solid-state Sensors and Actuators, Jun. 16-19, 1997, pp. 1271-1274.

Cole, B. et al, "Monolithic Two-Dimensional Arrays of Micromachined Microstructures for Infrared Applications", Proceedings of the IEEE, vol. 86, No. 8, Aug. 1998, pp. 1679-1686.

Hildenbrand J. et al., "Micromachined Mid-Infrared Emitter for Fast Transient Temperature Operation for Optical Gas Sensing Systems", IEEE Sensors 2008 Conference, 2008, pp. 297-300.

Ji X. et al, "A MEMS IR Thermal Source for NDIR Gas Sensors", IEEE, 2006.

Schneeberger, N. et al., "Optimized CMOS Infrared Detector Microsystems", Physical Electronics Laboratory, Zurich, IEEE, 1995, pp. 198-201.

Graf, A. et al., "Review of Micromachined Thermopiles for Infrared Detection", Measurement Science and Technology 18 (2007) R59-R75, 2007.

Kim, J-K et al., "A New Uncooled Thermal Infrared Detector Using Silicon Diode", Sensors and Actuators a 89 (2001) pp. 22-27, 2001.

Sah, P-T et al., "A Silicon Micromachined Infrared Emitter Based on SOI wafer", MEMS/MOEMS Technologies and Applications III, Proc. of SPIE vol. 6836, 2007.

Spannhake J. et al., "High-Temperature MEMS Heater Platforms: Long-term Performance of Metal and Semiconductor Heater Materials", Sensors, ISSN 1424-8220, pp. 405-419, 2006.

Weber, M. et al., "Improved Design for Fast Modulating IR Sources", J. Micromech. Microeng. 7, pp. 210-213, Oct. 21, 1996.

Lebental, Barritault, et al., "Mid-IR source based on a free-standing microhotplate for autonomous CO2 sensing in indoor applications", IOP Publishing, Sep. 2, 2011; 7 pages.

International Search Report and Written Opinion for corresponding International Application No. PCT/GB2018/053706, dated Jun. 6, 2019, 18 pages.

* cited by examiner

INFRA-RED DEVICE

TECHNICAL FIELD OF THE DISCLOSURE

The disclosure relates to infra-red (IR) devices, particularly but not exclusively, to micro-machined IR devices.

BACKGROUND OF THE DISCLOSURE

Infrared devices can be either infrared emitters, or infra-red detectors. Micro-machined IR emitters and detectors have the advantage of low cost and small size.

Thermal infrared emitters and infrared detectors are both well known in literature and fabricated using micro-machined processes. Thermal infrared emitters typically include a resistive micro-heater embedded within a thin membrane and supported on a silicon substrate. When current is passed through the heater, it heats up to a high temperature (which can be as much as 700° C. or even higher), and at this high temperature, the device emits infrared radiation.

A number of designs of IR emitters have been reported.

For Example, Parameswaran et. al. "Micro-machined thermal emitter from a commercial CMOS process," IEEE EDL 1991 reports a polysilicon heater for IR applications made in CMOS technology, with a front side etch to suspend the heater and hence reduce power consumption. Similarly, D. Bauer et. Al. "Design and fabrication of a thermal infrared emitter" Sens & Act A 1996, also describes an IR source using a suspended polysilicon heater. U.S. Pat. No. 5,285,131 by Muller et al.; US2008/0272389 by Rogne et. Al; and San et. al. "A silicon micromachined infrared emitter based on SOI wafer" (Proc of SPIE 2007) also describe similar devices using a polysilicon heater.

Yuasa et. al "Single Crystal Silicon Micromachined Pulsed Infrared Light Source" Transducers 1997, describe an infrared emitter using a suspended boron doped single crystal silicon heater. Watanabe, in EP2056337, describes a suspended silicon filament as an IR source. The device is vacuum sealed by bonding a second substrate.

Cole et. al. "Monolithic Two-Dimensional Arrays of Micromachined Microstructures for Infrared Applications" (proc of IEEE 1998) describe an IR source on top of CMOS processed device.

Designs based on a platinum heater have also been described. For example, Hildenbrand et. al. "Micromachined Mid-Infrared Emitter for Fast Transient Temperature Operation for Optical Gas Sensing Systems", IEEE Sensor 2008 Conference, reports on a platinum heater on suspended membrane for IR applications. Similarly Ji et. Al. "A MEMS IR Thermal Source For NDIR Gas Sensors" (IEEE 2006) and Barritault et. al "Mid-IR source based on a free-standing microhotplate for autonomous CO2 sensing in indoor applications" (Sensors & Actuators A 2011), Weber et. al. "Improved design for fast modulating IR sources", Spannhake et. Al. "High-temperature MEMS Heater Platforms: Long-term Performance of Metal and Semiconductor Heater Materials" (Sensors 2006) also describe platinum based as well as other emitters.

Some other IR emitter designs are disclosed by U.S. Pat. No. 6,297,511 by Syllaios et. al., U.S. Pat. Nos. 5,500,569, 5,644,676, 5,827,438 by Bloomberg et. al, and WO 02/080620 A1 by Pollien et. al.

Thermal IR detectors on a silicon substrate comprise a thin membrane layer (made of electrically insulating layers) that is formed by etching of part of the substrate. Incident IR radiation increases the temperature of the membrane—which can be measured by either a thermopile, a resistor, or a diode.

For example, Schneeberger et. al "Optimized CMOS Infrared Detector Microsystems," Proc IEEE Tencon 1995, reports fabrication of CMOS IR detectors based on thermopiles. The thermopile consists of several thermocouples connected in series. KOH (potassium hydroxide) is used to etch the membrane and improve the thermal isolation. Each thermocouple includes 2 strips of different materials, connected electrically and forming a thermal junction at one end (termed hot junction) while the other ends of the material are electrically connected to other thermocouples in series forming a thermal cold junction. The hot junctions of the thermocouples are on the membrane, while the cold junction is outside the membrane. Three different designs of the thermocouples are given in the paper with different material compositions: either Aluminium and p-doped polysilicon, Aluminium and n-doped Polysilicon, or p-doped polysilicon and n-doped polysilicon. Incident IR radiation causes a slight increase in temperature of the membrane. The Seebeck effect causes a slight voltage difference across each thermocouple—resulting in a much large increase in voltage difference across the thermopile which is the sum of the voltages across each thermocouple.

Several other thermopile devices are described by Graf et. al. "Review of micromachined thermopiles for infrared detection" Meas. Sci. Technol. 2007.

Another method of measuring the IR radiation is by the use of thermodiodes. For example, Kim "A new uncooled thermal infrared detector using silicon diode," S&A A 89, 2001, describes a diode fabricated by micromachining for use as an IR detector. However, the dome shaped silicon nitride window can be fragile and the irregular shape can affect the emission profile of the device.

Various types of packaging are used for these devices including metal, ceramic or plastic packaging.

Reflectors are commonly added to the Infra-red devices (both emitters and detectors). They are placed on top of the infrared devices within the same package. The reflectors optimize the angular distribution of radiation or absorption and, therefore improve the optical signal. They are usually expensive and they have relatively large form factor, which make the whole source or detector package significantly more voluminous.

SUMMARY OF THE DISCLOSURE

The disclosure relates to micro-machined infra-red (IR) devices. Infra-red devices can be either infrared emitters, or infrared detectors. Micro-machined IR emitters and detectors have the advantage of low cost and small size. The disclosure relates to increasing the emission or absorption of Infra-red devices by integrating a reflective layer within, or on, or above the membrane, or on the side walls of the Infra-red devices.

The IR devices can be connected to external circuits such as drive, read-out or processing circuits (such circuits could be in the form of ASICs) with wire bonds or solder balls (boll bonds) or through-semiconductor vias also known as through-silicon vias (TSVs). Optionally the circuits could be integrated into the same silicon chip as the IR devices. Alternatively the IR devices can sit in a flip chip configuration on top of the circuits and connected to circuits with solder balls.

According to one aspect of the present invention, there is provided an Infrared (IR) device comprising a substrate comprising an etched cavity portion and a substrate portion; a dielectric layer disposed on the substrate. The dielectric layer comprises a dielectric membrane. The dielectric membrane is adjacent, or directly above, or below the etched cavity portion of the substrate. The device further comprises a reflective layer on or in the dielectric membrane to enhance emission or absorption of infrared light at one or more wavelengths.

As discussed above, the state-of-the art IR emitters and detectors are based on traditional packaging methods involving (i) fabrication of wafers containing IR devices (ii) dicing (iii) packaging individual dies and adding filters, caps, lenses or reflectors. According to this disclosure, we propose the use of an integrated reflective layer on either side of the membrane area or on the side walls of the chip substrate to improve the emission/absorption of infra-red light. When the reflective layers are on the side walls they are still on, or above, or below the membrane area of the device. Therefore, the term "on" covers the reflective layers being directly on the membrane area (directly either side of the membrane area) of the dielectric layer, and being on the side walls of the substrate. It will be understood that the side walls are either above or below the membrane area and therefore the term "on" also covers this scenario.

Compared to state-of-the-art IR devices, the devices disclosed here will have the following advantages:
 (i) higher emission for an IR emitter or higher absorption for an IR detector
 (ii) no need for an additional reflector at wafer level
 (iii) smaller form factor
 (iv) significantly lower cost, as the component cost is often dictated by the package cost rather than device die The Infrared emitter and detectors can be manufactured using a back etching or front etching process/technique. The reflective metal can be formed before the etching process to define the membrane or after the etching process. The lithographic patterning using photoresist of the metal reflective layer can be obtained before or after the etching process. A CMOS process can be used for the patterning of the reflective layer and a lift off process can be used for its formation, for example after the membrane is formed.

The device can be used to detect infra-red absorption, as a detector or to emit infra-red as a source.

The reflective layer improves the IR emission or absorption at one or more wavelengths or the entire spectrum of infra-red (from near infra-red at 1.5 μm to long infra-red at 16 μm).

The dielectric membrane may also comprise a passivation layer and this can be made of silicon dioxide, silicon nitride and/or aluminium oxide.

The membrane and cavity portion of the substrate may be formed by bulk etching or surface etching. The bulk etching can be achieved by Deep Reactive Ion Etching (DRIE) or wet etching using Tetramethylammonium Hydroxide (TMAH) or Potassium Hydroxide (KOH). The surface etching can be achieved by using a chemical etching technique. The DRIE has the advantage of resulting in straight semiconductor walls and minimal area consumption. The surface etching requires surface holes through which the chemical etcher is released in the substrate. Surface etching allows a reflective layer to be formed in the cavity on the etched portion of the substrate. These membranes may be slightly more fragile using this technique, but they offer lower power consumption.

The dielectric membrane and/or the micro-heater may have a rectangular shape, a near rectangular shape with rounded corners to minimise stress at the corners, or a circular shape.

The reflective layer may be located directly underneath the dielectric membrane.

Alternatively, the reflective layer may be located directly above the dielectric membrane.

The reflective layer may be located on the walls of the etched cavity portion. This increases reflection of the light and reduces parasitic absorption of light in the chip substrate. This increases emission for an IR emitter and absorption for an IR detector.

The reflective layer may be present on the walls of the etched cavity portion and directly above, below, or within the dielectric membrane. This further increases emission for an IR emitter and absorption for an IR detector.

The cavity walls may be slanted or sloped. This may increase the surface area of the reflective layer, in turn increasing emission for an IR emitter and absorption for an IR detector. The slanted walls may be formed by isotropic etching such as wet etching using KOH or TMAH of the substrate.

The reflective layer may comprise a material selected from gold, platinum, aluminum, copper, chromium, nickel, titanium, tungsten and a combination of any of these materials.

The reflective layer may extend through the entire area of the dielectric membrane. This further increases emission for an IR emitter and absorption for an IR detector. Alternatively, the reflective layer may only be present on part of the membrane, preferably in the center. This avoids heat conduction losses through the reflective layer.

The reflective layer may comprise a continuous layer.

The reflective layer may comprise laterally spaced structures. The laterally spaced structures may comprise dots or mesh and may be configured to enhance infrared emission or absorption at certain wavelengths. Alternatively, the structures may comprise a circle, ellipse, rectangular, trapezoid or a combination of different shapes, or a hole of these shapes within a layer.

The reflective layer may be discontinuous, formed of disconnected dots or a mesh structure. Advantageously this can act as a plasmonic structure, thus enhancing the emission (or absorption in the case of the detector) at certain wavelengths, while filtering or not affecting other wavelengths.

The reflective layer (for example, placed at either side of the membrane) may become more absorbent or emissive when exposed to very high temperatures. This may increase the emission or absorption of IR radiation during the operation of the device or during heat treatment in an annealing step during the manufacturing of the device. Advantageously, the change in the lattice/chemical structure can be beneficial in terms of increased IR optical emission for the emitter or optical IR absorption for the detector.

The device may comprise further reflective structures outside the dielectric membrane between the dielectric layer and solder balls to act as interconnections or pads. This further increases emission or absorption of the IR device.

The device may further comprise an optically transmissive layer attached to the substrate. The device may further comprise any one of a filter, window, or lens built at the wafer level.

The optically transmissive layer, window, filter, or lens may be made of glass or silicon or a dielectric and can serve several purposes: (i) protect the device (ii) filter the signal in a certain region of the spectrum or (iii) alter the angle of light. The window can also seal hermetically the cavity leading to an improvement in the overall emission or absorption of the IR device. Vacuum or a gas with low thermal conductivity could be used inside the cavity.

The device may further comprise through-semiconductor vias placed within the substrate to connect the IR device to other circuits. This allows the device to be connected to external circuits such as drive, read-out or processing circuits. Additionally the device may further comprise at least one bonding ball coupled with the through-semiconductor via.

The device may be an infrared emitter having a micro-heater embedded below, above or within the membrane. When the heater is powered to a high temperature, the device emits infrared radiation.

The micro-heater can be a resistive heater made of a CMOS material such as aluminium, polysilicon, crystalline silicon, tungsten, copper or titanium, or a non-CMOS material such as platinum or gold. The heater can also be a MOSFET heater.

Alternatively, the device may be an infrared detector, and the detector may comprise any one of a thermopile, a pyro detector, a thermal diode or a bolometer.

The device may have a flip-chip configuration. In this case configuration, the reflective layer may be formed at the surface of the device, on the front side of the membrane. This embodiment has several advantages. The reflective layer can be more easily defined (patterned) by using lithography methods. Advantageously the reflective metal can be patterned with photoresist before the etching process is carried out, while the metal deposition and definition of the metal to form the reflective layer can be done either pre-etch or post-etch. The deposition and definition of the reflective layer may be done after the etching process by for example evaporation and lift-off. This technique is advantageous in the case where the reflective layer is made of gold or platinum or contains at least one of these materials, since these layers are not CMOS compatible. The gold reflective layer may also comprise Nickel or Chromium for avoiding diffusion of gold into the oxide and to help with the adhesion.

Another advantage of this configuration is that the IR device may be assembled and used in a flip-chip configuration and placed above a circuit (e.g. ASIC). For example solder balls may be used for connection. The solder balls may be placed on pads, and may be formed within the CMOS process or post-CMOS at wafer level or chip level. The placement of an IR device directly above a circuit (ASIC) would result in a system with a smaller surface area which could advantageously in terms of cost and packaging.

The third advantage of this configuration is that the IR device is less exposed to undesirable effects of any fluid flow. Such flow would act as a parasitic effect on an IR device. The trenches of the substrate protect the penetration of flow inside the cavity.

The device may be placed or arranged above an application specific integrated circuit using a flip chip technique or configuration.

The device may be configured such that the lattice or chemical structure of the reflective layer is changed at a high temperature. Generally speaking, the reflective layer changes its lattice/chemical structure and increases the absorption or emission when treated at a high temperature or during operation at very high temperatures.

There may be provided an IR device array assembly comprising: an array of a plurality of IR devices as disclosed above, wherein the plurality of devices are formed on the same chip.

There may be also provided a method of manufacturing an infrared device as disclosed above, the method comprising:
fabricating wafers and devices containing IR devices;
forming a reflective layer either prior to or after etching of the substrate.

It will be understood that the manufacturing steps above will be used in conjunction with usual manufacturing steps of the entire device, for example, these steps can be used in CMOS processing steps, and/or other suitable processing steps.

BRIEF DESCRIPTION OF THE PREFERRED EMBODIMENTS

Some preferred embodiments of the disclosure will now be described by way of example only and with reference to the accompanying drawings, in which.

DETAILED DESCRIPTION OF THE PREFERRED EMBODIMENTS

Figure 9:
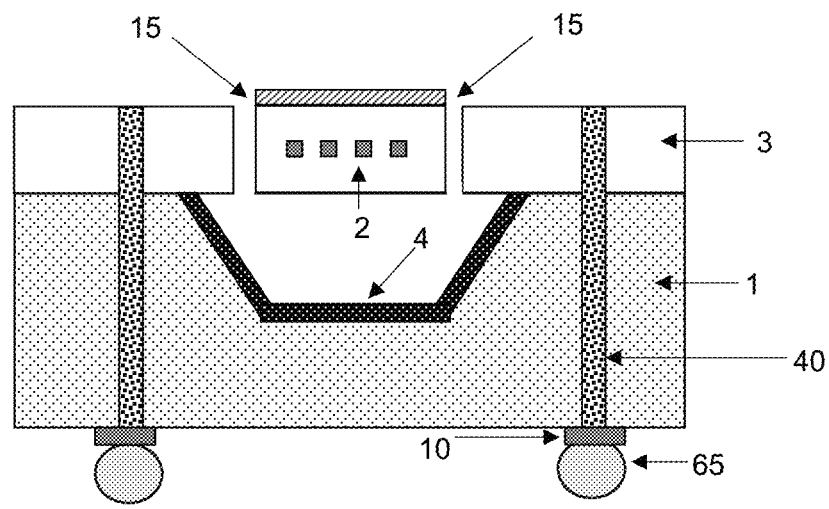
FIG. 9 shows an alternative IR device with a front side etch and reflective metal layer at the bottom of the cavity.

Generally speaking, the disclosure relates to a thermal infrared device with a reflective layer, preferably made of gold or platinum, but also possibly of Aluminium or Copper and possibly containing other metals such as Nickel and Chromium. The Infrared emitter and detectors can be manufactured using a back-etching technique (all figures except FIG. 9) or a front etching technique (FIG. 9). The reflective metal can be formed before the etching process to define the membrane, or after the etching process. The lithographic patterning using photoresist of the metal reflective layer can be conducted before or after the etching process. In one example, a complimentary metal oxide semiconductor (CMOS) process can be used for the patterning of the reflective layer and a lift off process can be used for its formation, for example, after the membrane is formed by etching part of the substrate. In the present disclosure, the term membrane can generally be defined by a membrane formed of dielectric materials and containing structures which can either emit or detect IR. The membrane is directly above or below the etched cavity portion of the substrate. In other words, the membrane area corresponds to the area matching the area of the etched cavity portion of the substrate.

The IR devices can be connected to external circuits such as drive, read-out, interface, or processing circuits (such circuits could be in the form of ASICS) with wire bonds or solder balls (or ball bonds) or through-semiconductor vias also known as through-silicon vias (TSVs). Optionally the circuits could be integrated into the same silicon chip as the IR devices. Alternatively, the IR devices can sit in a flip chip configuration on top of the circuits and connected to circuits with solder balls.

Some examples of the device are given in the accompanying figures.

Figure 1:
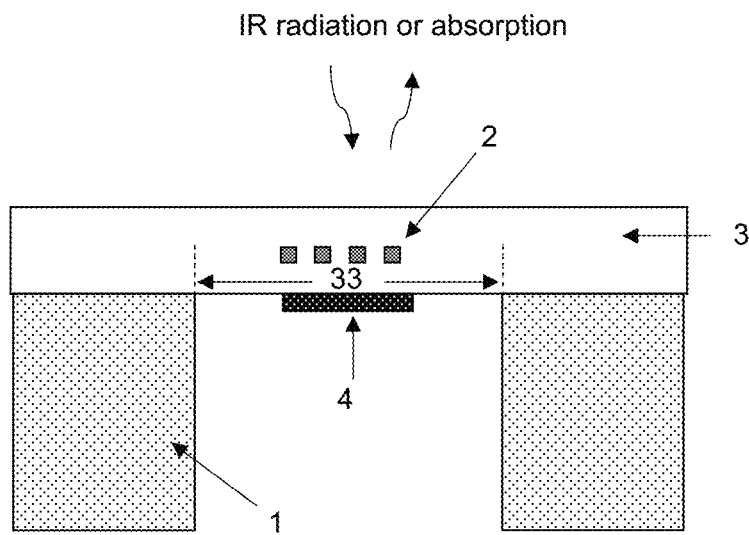
FIG. 1 shows an infrared emitter with a reflective metal layer placed under the heater within the membrane region.

FIG. 1 shows an exemplary infrared emitter. It comprises a dielectric layer 3 supported by a semiconductor substrate 1 which has an etched cavity. A heater 2 is embedded within the dielectric layer 3, which when powered to a high temperature emits infrared radiation. It will be understood that the dielectric layer 3 has a dielectric membrane region 33. The dielectric membrane region 33 is located immediately adjacent to the cavity of the substrate 1. The dielectric membrane region 33 corresponds to the area above the area of the cavity of the substrate 1. In this embodiment the heater is formed within the dielectric membrane. The definition of the membrane region 33 as shown in FIG. 1 is applicable in the remaining embodiments and figures described below.

A reflective layer 4, for example an IR reflective layer, is formed under the membrane 33. The reflective layer 4 is placed directly under the micro-heater 2. The IR reflective layer 4 is formed directly under the dielectric membrane 33 to increase the IR emission or absorption. In one embodiment, this reflective layer 4 can be made of an IR reflective material such as platinum, gold, silver, copper or aluminium. Alternatively, a sandwich of different metals, comprising gold, platinum, nickel or gold could be used. The reflective layer 4 improves the IR emission or absorption at one or more wavelengths or the entire spectrum of infra-red (from near infra-red at about 1.5 μm to long infra-red at about 16 μm).

In one embodiment, the dielectric layer 3 including the dielectric membrane region 33, can comprise silicon dioxide, silicon nitride and/or aluminium oxide. The heater 2 can be a resistive heater made of a CMOS material such as aluminium, polysilicon, crystalline silicon, tungsten, copper or titanium, or a non-CMOS material such as platinum or gold. Alternatively, the heater can also be a MOSFET heater.

In one example, the membrane region 33 is formed when the cavity is formed by bulk etching or surface etching and the membrane region corresponds to the dielectric region which is immediately above or below the cavity. The bulk etching can be achieved by Deep Reactive Ion Etching (DRIE) or wet etching using TMAH or KOH. The surface etching can be achieved by using chemical etching. The DRIE has the advantage of resulting in straight semiconductor walls and minimal area consumption. The surface etching requires surface holes through which the chemical etcher is released in the substrate. These membranes are slightly more fragile using this technique, but they offer lower power consumption.

Figure 2:
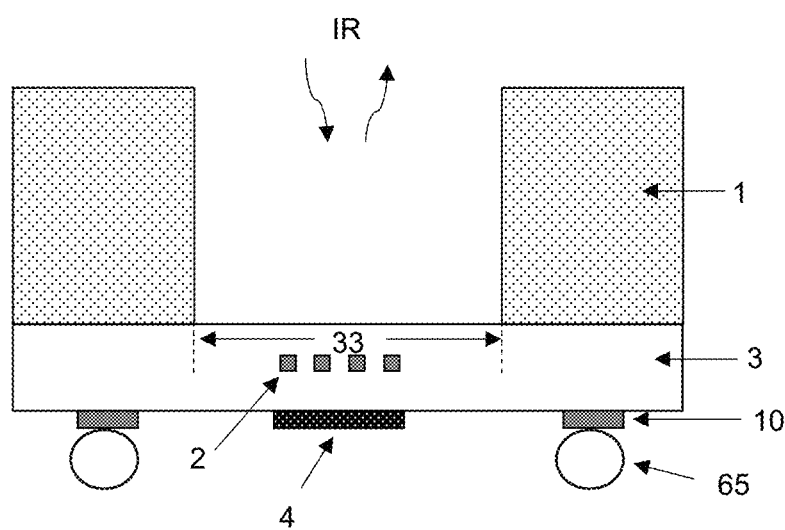
FIG. 2 shows an alternative infrared emitter in a flip chip configuration with a reflective metal layer placed under the heater within the membrane region.

The dielectric membrane 33 and/or the heater 2 can have a rectangular shape, or a near rectangular shape with rounded corners to minimise stress at the corners or a circular shape FIG. 2 shows an alternative IR device in which the reflective layer is formed at the surface of the device and on the front side of the device. Many features of the emitter of FIG. 2 are the same as those in FIG. 1, and therefore carry the same reference numerals. In this embodiment the reflective layer 4 is formed at the surface of the device (as opposed to FIG. 1) and on the front side of the device. The device is then flip-chipped during mounting and the IR emission absorption occurs through the cavity (trench) formed between the substrate side walls.

The reflective layer 4 of this embodiment can be more easily defined (patterned) by using lithography methods. Advantageously the reflective metal 4 can be patterned with photoresist before the etching process is carried out while the metal deposition and definition of the metal to form the reflective layer can be done either pre-etch or post-etch. If the reflective layer 4 is made of gold or platinum and since these layers are not CMOS compatible, it is possible that the deposition and definition of this layer is done after etch by for example evaporation and lift-off.

The IR sensor of this embodiment is less exposed to undesirable effects of any fluid flow. Such flow would act as a parasitic effect on an IR device. The side walls of the substrate protect the penetration of flow inside the cavity. The specific IR device shown in FIG. 2 is an emitter and in this case is a micro-heater, 2.

Figure 3:
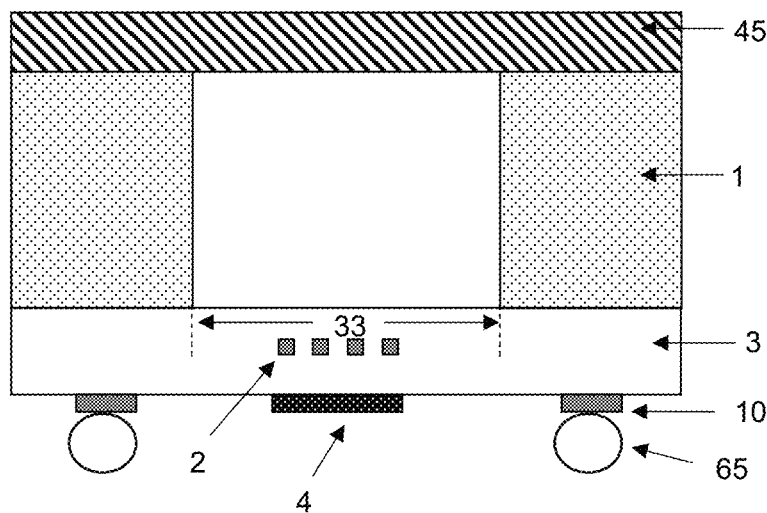
FIG. 3 shows an alternative infrared emitter in a flip chip configuration with a reflective metal layer placed under the heater within the membrane region. A filter/window/lens is placed above the silicon substrate.

FIG. 3 shows an alternative IR device with an optically transmissive layer over the cavity. Many features of the emitter of FIG. 3 are the same as those in FIG. 1, and therefore carry the same reference numerals. An optically transmissive layer 45 is formed on top of the substrate 1 and cavity. The optically transmissive layer can be a filter, window, or a lens. The substrate provides support to the optically transmissive layer 45. The optically transmissive layer 45 can comprise glass, silicon or any dielectric material. The optical transmissive layer can have several purposes. For example, the optically transmissive layer 45 may protect the device. Further, the optically transmissive layer 45 may filter the signal in a certain region of the spectrum. Additionally, the optically transmissive layer 45 may alter the angle of light entering the cavity. The transmissive layer 45 or the window can also seal hermetically the cavity leading to an improvement in the overall emission or absorption of the IR device. Vacuum or a gas with low thermal conductivity could be used inside the cavity.

The optically transmissive layer 45 can be an infrared window with a large pass band, an infrared filter with a narrow pass band, or an infrared lens. For example, a narrow band filter centred at a wavelength of 4.26 μm would be of interest for $CO_2$ gas detection. A broadband window around 8-14 μm could be of interest for human presence detection.

Figure 4:
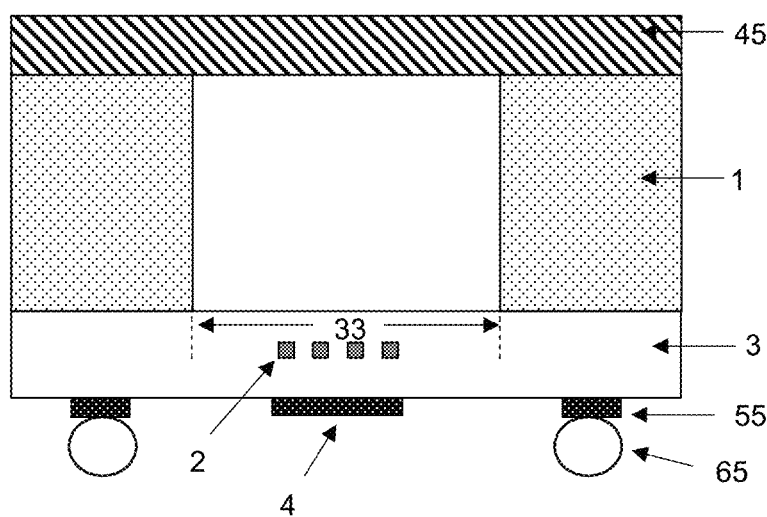
FIG. 4 shows an alternative infrared emitter in which a reflective material is used for the pads connected to the solder balls.

FIG. 4 shows an alternative IR device in which the reflective layer is also formed outside of the membrane area. Many features of the emitter of FIG. 3 are the same as those in FIG. 1, and therefore carry the same reference numerals. In this embodiment, the reflective layer 4 is also formed outside of the membrane area 33. The reflective layer 4 is formed between the dielectric layer 3 and the solder balls 65. The reflective layer 4 can act as interconnects or pads. Generally speaking, the IR device of FIG. 4 is a micromachined thermal infrared emitter in a flip chip configuration.

Figure 5:
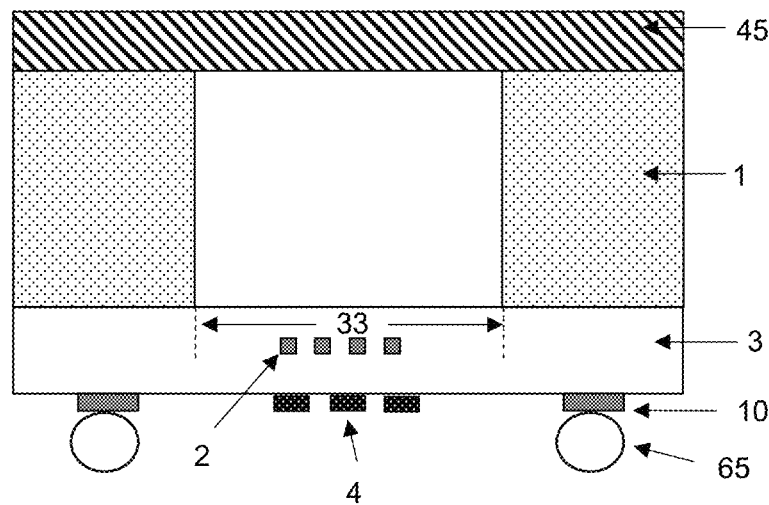
FIG. 5 shows an alternative IR device in which the reflective layer is discontinuous.

FIG. 5 shows an alternative IR device in which the reflective layer 4 is discontinuous. Many features of the device of FIG. 5 are the same as those in FIG. 1, and therefore carry the same reference numerals. In this embodiment, the reflective layer 4 is discontinuous. The reflective layer 4 can be disconnected dots or a mesh structure. In this embodiment, the reflective layer 4 acts as a plasmonic structure. This enhances the emission (or absorption in the case of the detector) at certain wavelengths, while filtering or not affecting other wavelengths.

Figure 6:
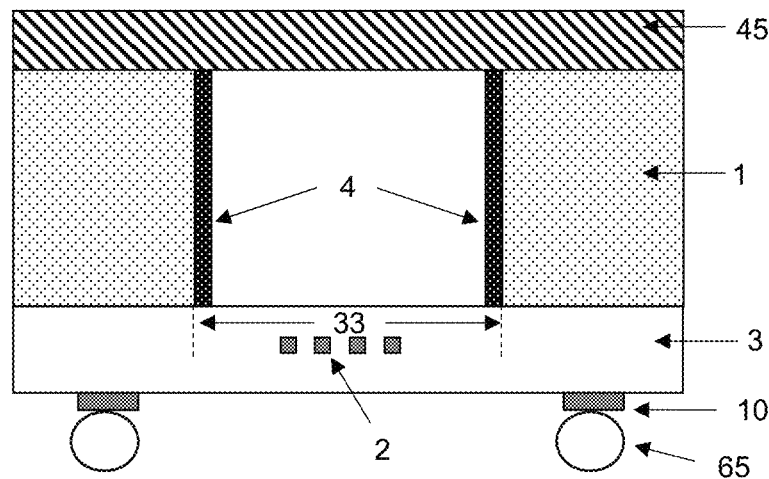
FIG. 6 shows an alternative IR device in which the IR reflective layer is formed on the side walls of the chip substrate in the cavity area.

FIG. 6 shows an alternative IR device in which the IR reflective layer is formed on the side walls of the chip substrate, in the cavity area. Many features of the device of FIG. 6 are the same as those in FIG. 1, and therefore carry the same reference numerals. The location of the IR reflective layer 4 on the side walls helps reflection of the light and avoids parasitic absorption of light in the chip substrate 1.

Figure 7:
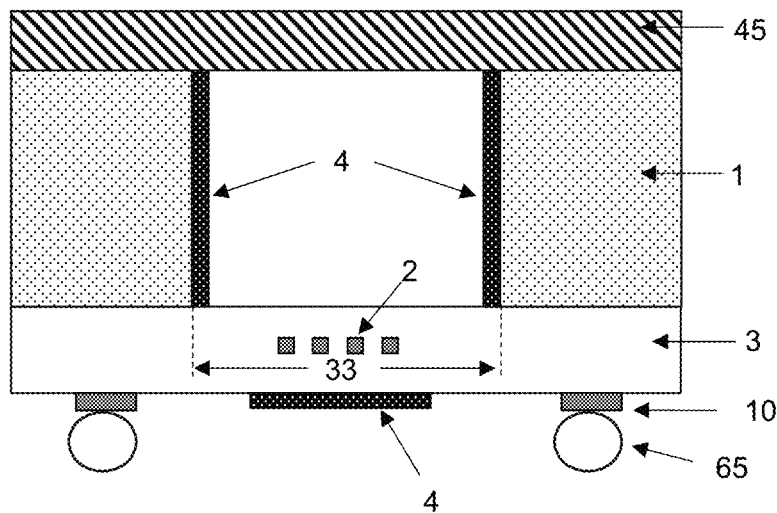
FIG. 7 shows an alternative IR device in which the IR reflective layer is formed both under the emitter, and on the side walls of the substrate.

FIG. 7 shows an alternative IR device in which the IR reflective layer is formed both under the emitter, and on the side walls of the substrate. Many features of the device of FIG. 7 are the same as those in FIG. 1, and therefore carry the same reference numerals. In this embodiment, the IR device is a micro-machined thermal infrared emitter in a flip chip configuration. A filter/window/lens is placed above the silicon substrate 1.

Figure 8:
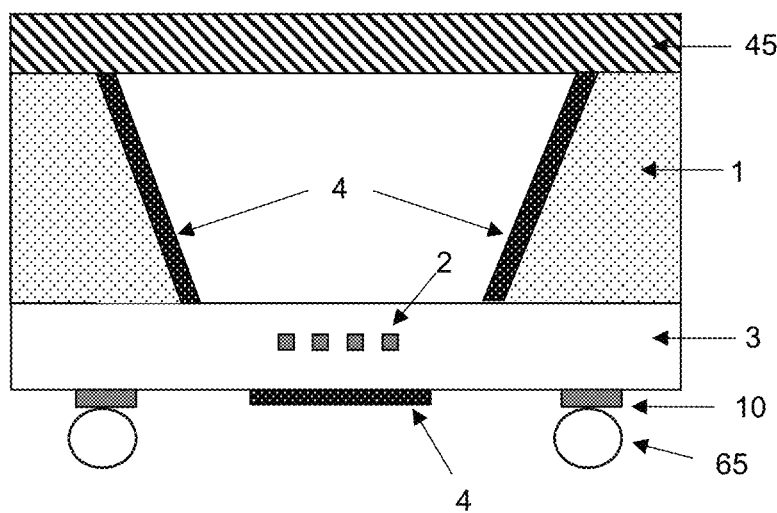
FIG. 8 shows an alternative IR device in which the substrate has slanted sidewalls.

FIG. 8 shows an alternative IR device in which the substrate 1 has slanted sidewalls. Many features of the device of FIG. 8 are the same as those in FIG. 1, and therefore carry the same reference numerals. In this embodiment, the substrate 1 has angled sidewalls, possibly formed by wet etching of the substrate using KOH (Potassium Hydroxide) or TMAH (tetramethylammonium hydroxide). The cavity has sloping sidewalls, and the sidewalls are coated with an IR reflective material to form an IR reflective layer 4.

FIG. 9 shows an alternative IR device with a front side etch and reflective metal layer 4 at the bottom of the cavity. Many reference numerals of FIG. 9 are the same as those used in FIG. 1. The front side etching may be performed by etching through holes 15 of the membrane. An IR reflective layer 4 is formed in the cavity on the etched portion of the substrate 1. An IR reflective metal is placed at the bottom of the cavity to form an IR reflective layer 4. This increases the emission and reduces the absorption of IR in the silicon substrate 1. Through Semiconductor Vias (TSVs) (also known as Through Silicon Vias or Through Wafer Vias) 40 allow electrical connection from the top surface to the pads 10 and solder balls 65 on the bottom surface. These could advantageously be used to connect a circuit (ASIC) under the IR device. Generally speaking, the device of FIG. 9 is a micro-machined thermal infrared emitter in a flip chip configuration with a reflective metal layer placed on the substrate angled trench walls below the heater and the cavity of the heater. Holes 15 are provided to define the cavity by front-side etching.

The TSVs, 40 may comprise a highly conductive material, such as Copper (Cu), Tungsten (W) or highly doped polysilicon, a dielectric material such as silicon dioxide or nitride, and a liner or a refractory metal barrier such as Ti, TiN, Ta, or TaN (not shown) sandwiched between the conductive material and the dielectric. Bonding pads 10 made of conductive material (such as Copper, Tungsten or Aluminium) are provided between the solder bumps or balls 65. The solder bumps 65 could also be made of a metal such as Copper, Nickel, Aluminium or combination of metals.

Figure 10:
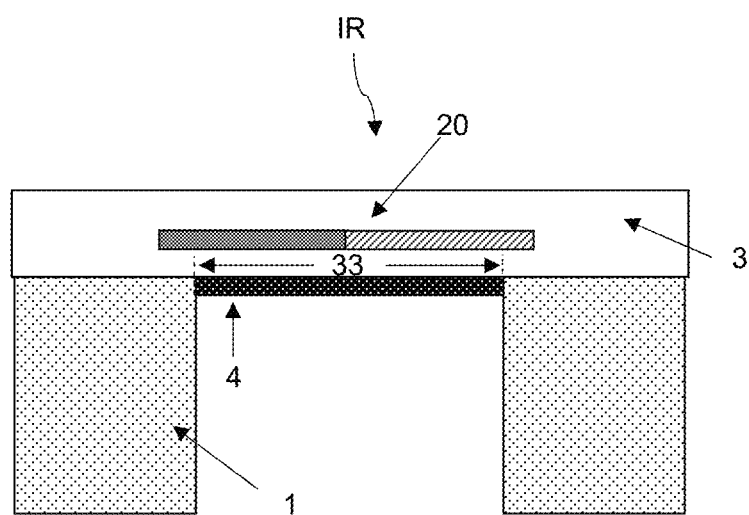
FIG. 10 shows an alternative IR device in which a detector is used.

FIG. 10 shows an alternative IR device in which a detector is used. Many features of the device of FIG. 10 are the same as those in FIG. 1 (except the arrangement of the detector), and therefore carry the same reference numerals. The infrared detector is based on a thermopile 20, comprising one or more strip of two different materials. The IR detector 20 could be a thermal detector in the form of a thermopile (formed of series of thermocouples), silicon or polysilicon diode or a bolometer. In one embodiment, the materials can be a p-type or n-type polysilicon or crystalline silicon, and connected together with a metal. In other embodiments, the thermopile material can also be a metal such as aluminium, tungsten, copper or titanium. The thermal detector 20 could be made within the CMOS process with CMOS compatible materials.

In this embodiment, the IR reflective layer 4 extends under the whole dielectric membrane area 33. The reflective layer, 4 could extend over the entire membrane area 33 or be present only on part of the membrane area, most favourably in the centre to avoid heat conduction losses through the reflective layer 4 itself.

Figure 11:
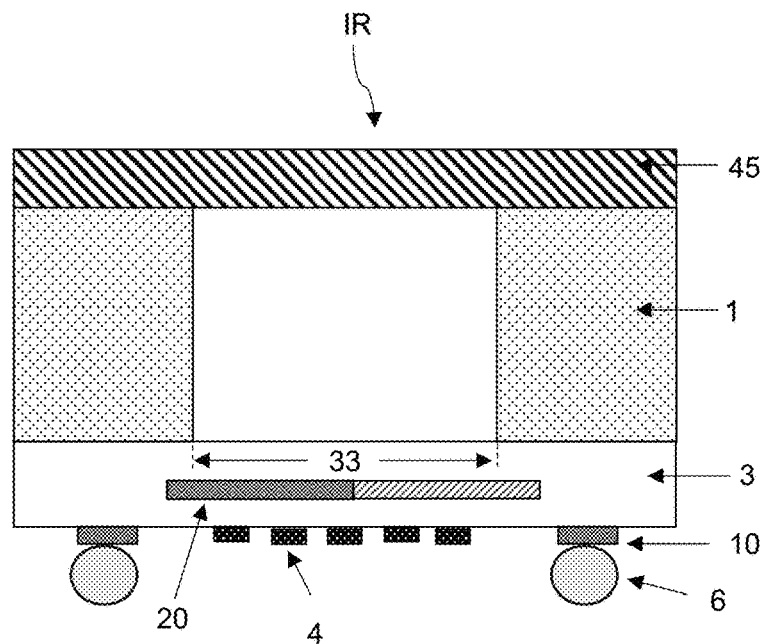
FIG. 11 shows an alternative IR device in which an IR detector is used in a flip-chip configuration.

FIG. 11 shows an alternative IR device in which an IR detector is used in a flip-chip configuration. Many features of the device of FIG. 11 are the same as those in FIG. 1, and therefore carry the same reference numerals, except that in this embodiment the reflective layer 4 is discontinuous. The IR detector could be a thermal detector in the form of a thermopile (formed of series of thermocouples), silicon or polysilicon diode, a pyro detector or a bolometer. The thermal detector could be made within the CMOS process with CMOS compatible materials such as silicon, polysilicon or CMOS metals such as Aluminium, Copper or Tungsten. The reflective layer, 4 could be patterned to form a discontinuous layer of disconnected dots or a mesh and can act as a plasmonic structure, thus enhancing the absorption of IR light at certain wavelengths, while filtering or not affecting other wavelengths. Generally speaking, the device of FIG. 11 is a micro-machined thermal infrared detector in a flip chip configuration with a patterned reflective metal layer placed under the heater within the membrane region. A filter/window/lens is placed above the silicon substrate.

Figure 12:
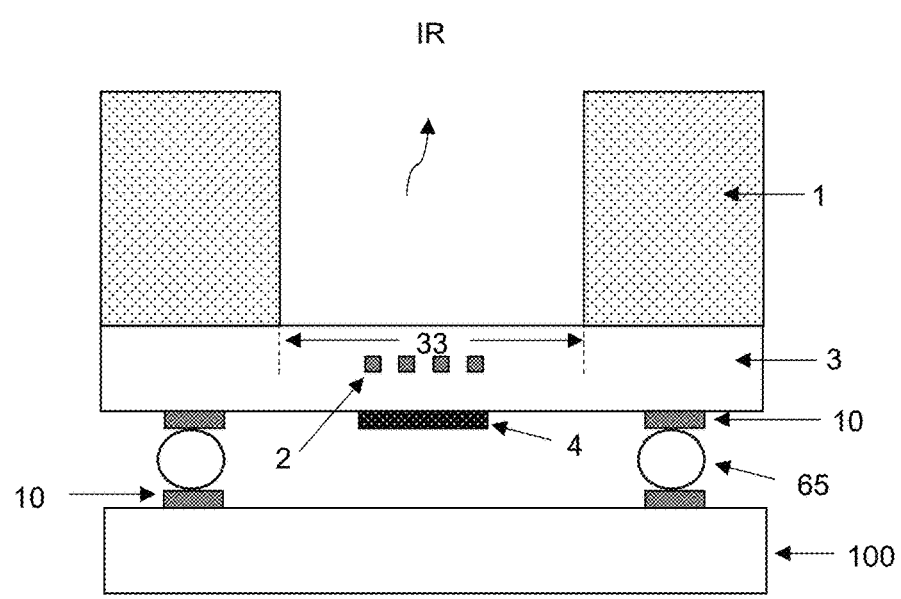
FIG. 12 shows an alternative IR device in which an IR detector is used in a flip-chip configuration and placed above an application specific integrated circuit (ASIC)

FIG. 12 shows an alternative IR device in which an IR detector is used in a flip-chip configuration and placed above a circuit (ASIC). Many features of the device of FIG. 12 are the same as those in FIG. 2, and therefore carry the same reference numerals. However, the IR device of this embodiment can be placed above a circuit, e.g. an application specific integrated circuit (ASIC), schematically shown here as 100, by using solder balls or bumps, 65 for connection. The solder balls 65 are typically placed on pads, 10 and can be formed within the CMOS process or post-CMOS at wafer level or chip level on both the IR device and the ASIC. The placement of an IR device directly above a circuit (ASIC) can result in a system with a smaller surface area which could advantageous in terms of cost and packaging. The ASIC placed below the IR device may be applied to all the embodiments of this disclosure.

Figure 13:
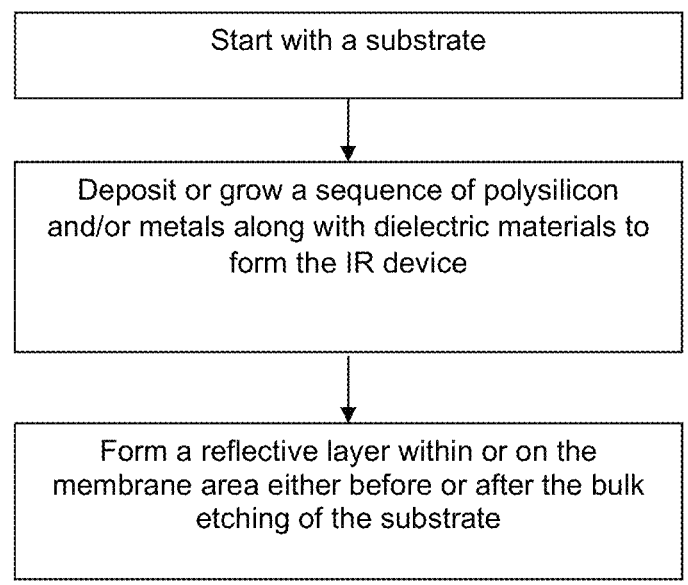
FIG. 13 illustrates an exemplary flow diagram outlining the manufacturing steps of an IR device in accordance with the present disclosure.

FIG. 13 illustrates an exemplary flow diagram outlining the manufacturing method of the IR device.

LIST OF REFERENCE NUMERALS 1. semiconductor substrate
2. heater 3. dielectric layer
4. reflective layer
10. interconnect pads
15. holes in dielectric membrane
20. sensor
33. dielectric membrane region
40. through silicon vias
45. optically transmissive layer
55. reflective interconnect pads
65. solder balls/bumps
100. ASIC (Drive, Read-out, processing and/or interface circuit)

The skilled person will understand that in the preceding description and appended claims, positional terms such as 'above', 'overlap', 'under', 'lateral', etc. are made with reference to conceptual illustrations of an apparatus, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. An infra-red (IR) device comprising:
   a substrate comprising an etched cavity portion and a substrate portion;
   a dielectric layer disposed on the substrate, wherein the dielectric layer comprises a dielectric membrane, wherein the dielectric membrane is adjacent to the etched cavity portion of the substrate;
   a reflective layer on or in the dielectric membrane to enhance emission or absorption of an entire spectrum of infrared light wavelengths, and wherein the reflective layer consists of a single continuous layer, and wherein the reflective layer extends through an entire area of the dielectric membrane.

2. A device according to claim 1, wherein the reflective layer is located directly underneath the dielectric membrane.

3. A device according to claim 1, wherein the reflective layer is located directly above the dielectric membrane.

4. A device according to claim 1, wherein the reflective layer is located on walls of the etched cavity portion.

5. A device according to claim 1, wherein the reflective layer comprises a material selected from gold, platinum, aluminum, copper, chromium, nickel, titanium, tungsten and a combination of any of these materials.

6. A device according to claim 1, comprising further reflective structures outside the dielectric membrane between the dielectric layer and solder balls to act as interconnections or pads.

7. A device according to claim 1, further comprising an optically transmissive layer attached to the substrate.

8. A device according to claim 1, further comprising any one of a filter, window, or lens built at a wafer level.

9. A device according to claim 1, further comprising through-semiconductor vias placed within the substrate to connect the IR device to other circuits.

10. A device according to claim 9, further comprising at least one bonding ball coupled with the through-semiconductor via.

11. A device according to claim 1, wherein the device is an infrared emitter having a micro-heater embedded below, above or within the membrane.

12. A device according to claim 1, wherein the device is an infrared detector, and wherein the detector comprises any one of a thermopile, a pyro detector, a thermal diode or a bolometer.

13. A device according to claim 1, wherein the device has a flip-chip configuration.

14. A device according to claim 1, wherein the device is configured to be placed above an application specific integrated circuit using a flip chip technique.

15. A device according to claim 1, wherein the device is configured such that a lattice or chemical structure of the reflective layer is changed during operation.

16. An IR device array assembly comprising:
   an array of a plurality of IR devices according to claim 1, wherein said plurality of devices are formed on a single chip.

17. A method of manufacturing an infrared device according to claim 1, the method comprising:
   fabricating wafers and devices containing IR devices; and
   forming a reflective layer either prior to or after etching of the substrate.

* * * * *